(12) United States Patent
Des Jardins

(10) Patent No.: US 10,445,360 B2
(45) Date of Patent: Oct. 15, 2019

(54) CONTENT ANALYSIS TO ENHANCE VOICE SEARCH

(71) Applicant: COMCAST CABLE COMMUNICATIONS, LLC, Philadelphia, PA (US)

(72) Inventor: George Thomas Des Jardins, Washington, DC (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 972 days.

(21) Appl. No.: 14/950,244

(22) Filed: Nov. 24, 2015

(65) Prior Publication Data
US 2017/0147576 A1  May 25, 2017

(51) Int. Cl.
| | |
|---|---|
| G06F 16/00 | (2019.01) |
| G06F 16/48 | (2019.01) |
| G10L 15/06 | (2013.01) |
| G06Q 30/02 | (2012.01) |
| G06F 16/28 | (2019.01) |
| G06F 16/783 | (2019.01) |
| G10L 15/08 | (2006.01) |

(52) U.S. Cl.
CPC ............ *G06F 16/48* (2019.01); *G06F 16/285* (2019.01); *G06F 16/7844* (2019.01); *G06Q 30/0256* (2013.01); *G10L 15/063* (2013.01); *G10L 2015/088* (2013.01)

(58) Field of Classification Search
CPC .......................... G06F 17/30038; G06F 16/48
USPC ........................................................ 707/722
See application file for complete search history.

(56) References Cited

U.S. PATENT DOCUMENTS 9,832,501 B2 * 11/2017 Ruffini ............. H04N 21/25891
2016/0063998 A1 * 3/2016 Krishnamoorthy ..... G10L 15/02
704/254

\* cited by examiner

*Primary Examiner* — Chelcie L Daye
(74) *Attorney, Agent, or Firm* — Banner & Witcoff, Ltd.

(57) ABSTRACT

Methods and apparatus for improving speech recognition accuracy in media content searches are described. An advertisement for a media content item is analyzed to identify keywords that may describe the media content item. The identified keywords are associated with the media content item for use during a voice search to locate the media content item. A user may speak the one or more of the keywords as a search input and be provided with the media content item as a result of the search.

20 Claims, 7 Drawing Sheets

US 10,445,360 B2

CONTENT ANALYSIS TO ENHANCE VOICE SEARCH

BACKGROUND

Voice recognition systems can be useful tools for controlling a computing system, but the usefulness of such a system is limited by the vocabulary that the voice recognition system can recognize. In some situations, such as dealing with ever-changing media content (e.g., television programs, movies, songs, etc.), the relevant vocabulary can be difficult to establish, because of the wide variety of words and terms (and even unusual terms, like names) that may be used to refer to that content.

In current systems, the difficulty with establishing a relevant vocabulary with which to describe media assets may result in a user being unable to find the media content that the user is searching for, because the user may not know the particular vocabulary used by a media search system and/or media guide to refer to that media content. There remains an ever-present need for a media search system that allows the user to search for content in a more natural manner.

SUMMARY

The following summary is for illustrative purposes only, and is not intended to limit or constrain the detailed description.

Aspects of the disclosure relate to apparatuses, computer-implemented methods, and computer-readable media for determining keywords associated with a first media content, such as an audiovisual advertisement, determining that the first media content describes or relates to a second media content, and associating the keywords with the second media content. In aspects of the disclosure, the keywords may be determined from audio, video, metadata and/or closed captioning portions of the first media content. Speech recognition may be used in determining keywords from the audio portion of the first media content. In addition, various online resources may be accessed for information to use in determining the keywords. In some aspects, the keywords may be stored in a speech recognition database for use during a speech based search.

Other aspects of the disclosure describe a method for using speech as input to a media item search. In some aspects, a speech utterance by a user may be recognized or otherwise converted to text or other representation. The converted utterance may be compared to keywords associated with media items, for example to keywords stored in a speech recognition database and associated with media items, in order to locate a media item with one or more keywords corresponding to the utterance. In some aspects, a voice search may be used to locate a media item.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

Figure 1:
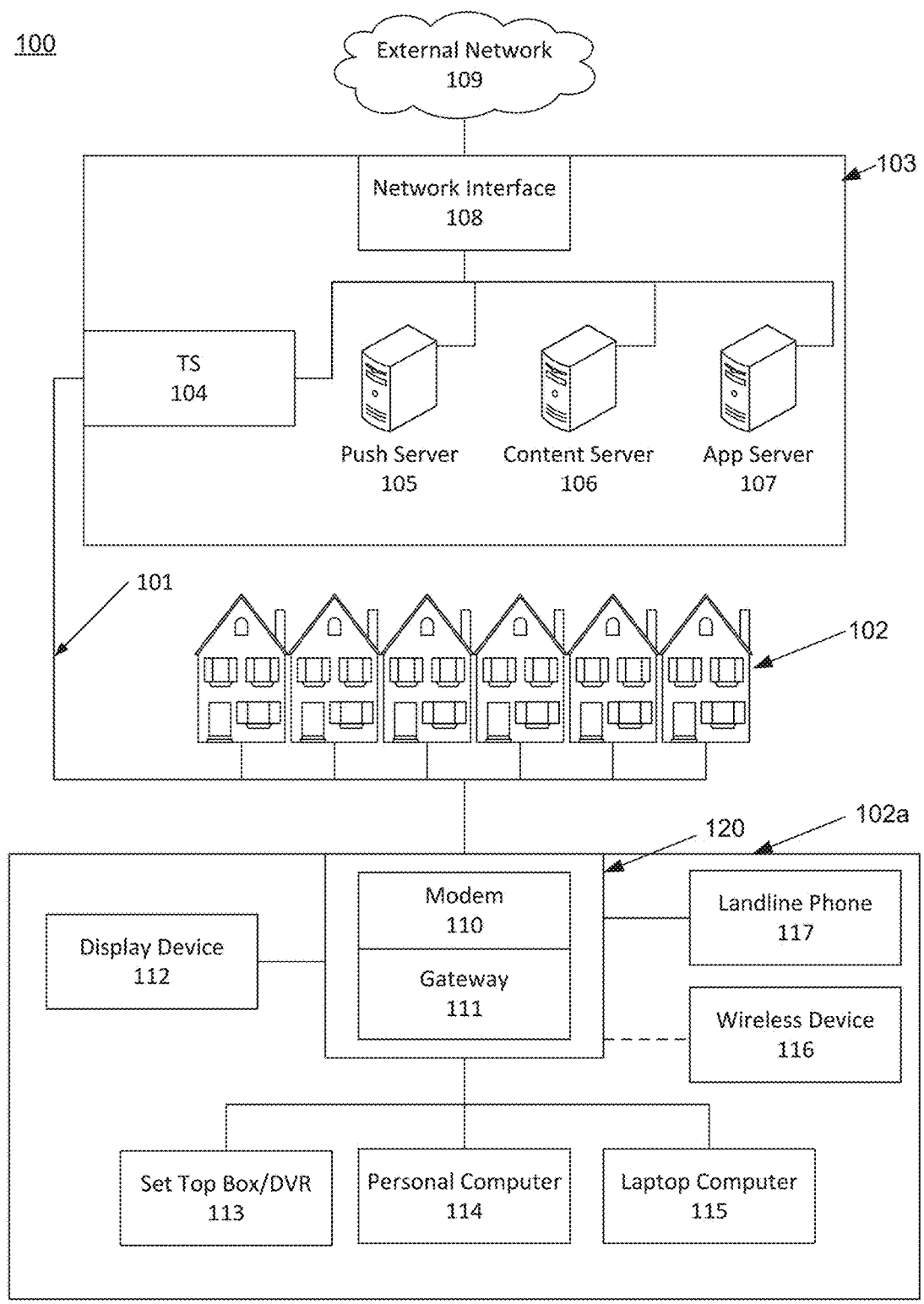
FIG. 1 shows an example communication network on which various features described herein may be used.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

The present disclosure describes several features of a voice recognition search system, also referred to as a media search system. Advertisements that promote a product often use ideal keywords to describe the advertised product, and it may be helpful to use those keywords to train a voice recognition search system to better identify if a user is asking about the advertised product. For example, an advertisement campaign for a media content series such as "Ali G Rezurection" may use a particular phrase, e.g., "Da Ali G Show," (a phrase used in the past to identify the show) in describing the media content in its advertisements. The present disclosure describes features of a voice recognition search system that is able to associate that phrase with the media content. In embodiments herein, the various advertisements for the "Ali G Rezurection" television show may be preprocessed to identify those phrases, and the phrases may be added to a database of keywords and phrases that are understood by a voice recognition search system to refer to the "Ali G Rezurection" media content. Media content or media content items, as referred to herein, may include various types of broadcast television shows and movies, on-demand television shows and movies, internet based videos, music videos, streaming videos, songs, podcasts, and any other media files.

The advertisements may vary in type, and each type may be processed differently to identify the keywords and phrases. For example, if an advertisement is an audiovisual commercial, the system may extract the video content and the audio content and separately process the video and audio content of the audiovisual stream to identify keywords and phrases. For example, keywords and phrases may be identified from the audio content by performing a speech to text conversion of the audio content of the audiovisual commercial and identifying particular keywords from the converted text of the audio stream. For example, a natural language processing (NLP) system may be able to identify particular words from the converted text of the audio stream to be keywords for use in searching. The video portion of the audiovisual commercial may be processed differently than the audio portion to identify keywords. For example, the system may perform optical character recognition (OCR) processing of each frame of the video content of the audiovisual stream to identify text in each frame. The resulting OCR text from the video portion may be processed using an NLP system to identify particular keywords. The system may remove duplicate keywords present in both the processed text of the audio and the video portions of the audiovisual commercial.

As another example, if the advertisement is an Internet page with text and graphics, the system may extract all the keywords from the text. The system may perform OCR on each graphic present in the Internet page and identify keywords from any resulting text. The system may remove duplicate keywords present in the text and the graphics of the Internet page.

As yet another example, if the advertisement is an audio advertisement (e.g., on a radio station or podcast), the system may perform a speech to text conversion of the audio content of the audio commercial and identify particular keywords from the converted text of the audio stream.

In each of the examples above, the system may process the advertisement to identify keywords and phrases that refer to the "Ali G Rezurection" media content item. Those keywords and phrases may then be added to the metadata for the "Ali G Rezurection" media content item. By adding keywords found in the advertisements and related media content promoting the "Ali G Rezurection" media content item to that media content item's metadata, the system may enrich the search database that is queried during a media content search. For example, by adding keywords to the metadata for media content items that is searched during a media content search, the system may yield search results with higher accuracy if the user searches for a particular media content item with keywords describing the media content item that would otherwise not be present in the title of the show or summary of the media content item.

In some embodiments, the media search system may use advertisements to identify pertinent keywords that correspond to the content being advertised, and train a voice recognition system to associate those keywords with the content being advertised. The media search system may analyze each advertisement to determine whether the advertisement is promoting a particular media content, or whether the advertisement is unrelated to and/or not promoting any media content that is accessible to the media search system. The media search system may be able to distinguish advertisements from the rest of the media content programming. Upon detecting advertisements, the media search system may analyze the media content of the advertisement to determine which media content item (if any) the advertisement is promoting. If the advertisement is determined to promote a media content item, the media search system may further analyze the media content of the advertisement and extract keywords from the advertisement to add to the list of voice-recognizable keywords for the corresponding media content item being promoted. The addition of such keywords may help make it easier for a user to use voice commands to ask for a particular media content, such as a television show, by training the system to recognize the words that are used in advertisements for the media content.

In some embodiments, the media search system may also monitor user voice input to add keywords to media content metadata. By monitoring the user voice input, the media search system may add keywords that users use to describe media content items into the media content metadata for the corresponding media content items. Voice input may be processed by a speech recognition system to detect if the user is talking about a particular media content. The voice input may be monitored to identify words and phrases that the user uses to describe each particular media content. For example, the user's voice input may be converted to a text stream using a speech to text conversion algorithm. The media search system may process the text stream using NLP algorithms to identify keywords in the user phrases that may be used by the user to describe a media content item. Such keywords identified from the user's voice input may be stored in the metadata of corresponding media content items to improve future voice searches.

FIG. 1 shows an example communication network 100 on which many of the various features described herein may be implemented. The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or a headend. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly. Portions of the links 101 may also be implemented with fiber-optic cable, while other portions may be implemented with coaxial cable, other lines, or wireless communication paths.

The local office 103 may include an interface 104, for example, a termination system (TS). More specifically, the interface 104 may be a cable modem termination system (CMTS), which may be a computing device configured to manage communications between devices on the network of links 101 and backend devices such as the computing devices 105-106 and the application server 107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of computing devices 105-106 and the application server 107 that may be configured to perform various functions. For example, the local office 103 may include a push server 105. The push server 105 may generate push notifications to deliver data and/or commands to the various premises 102 in the network (or more specifically, to the devices in the premises 102 that may be configured to detect such notifications). The local office 103 may also include a computing device 106, which may be a content server. The computing device 106 may be one or more computing devices that are configured to provide content to users at their premises. This content may be, for example, video on demand movies, television programs, songs, text listings, etc. The computing device 106 may include software to validate user identities and entitlements, to locate and retrieve requested content, to encrypt the content, and/or to initiate delivery (e.g., streaming) of the content to the requesting user(s) and/or device(s). Indeed, any of the hardware elements described herein may be implemented as software running on a computing device.

The local office 103 may also include one or more application servers such as application server 107. The application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements and providing personalized media content recommendations to the user. Yet another application server may be responsible for formatting and inserting advertisements in a video stream being transmitted to the premises 102. Although shown separately, one of ordinary skill in the art will appreciate that the computing devices 105, 106, and/or the application server 107 may be combined. Further, here the computing devices 105, 106, and the application server 107 are shown generally, and it will be understood that they may each contain memory storing computer executable instructions to cause a processor to perform steps described herein and/or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may be a set-top box (STB), digital video recorder (DVR), computer server, or any other desired computing device. The gateway interface device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
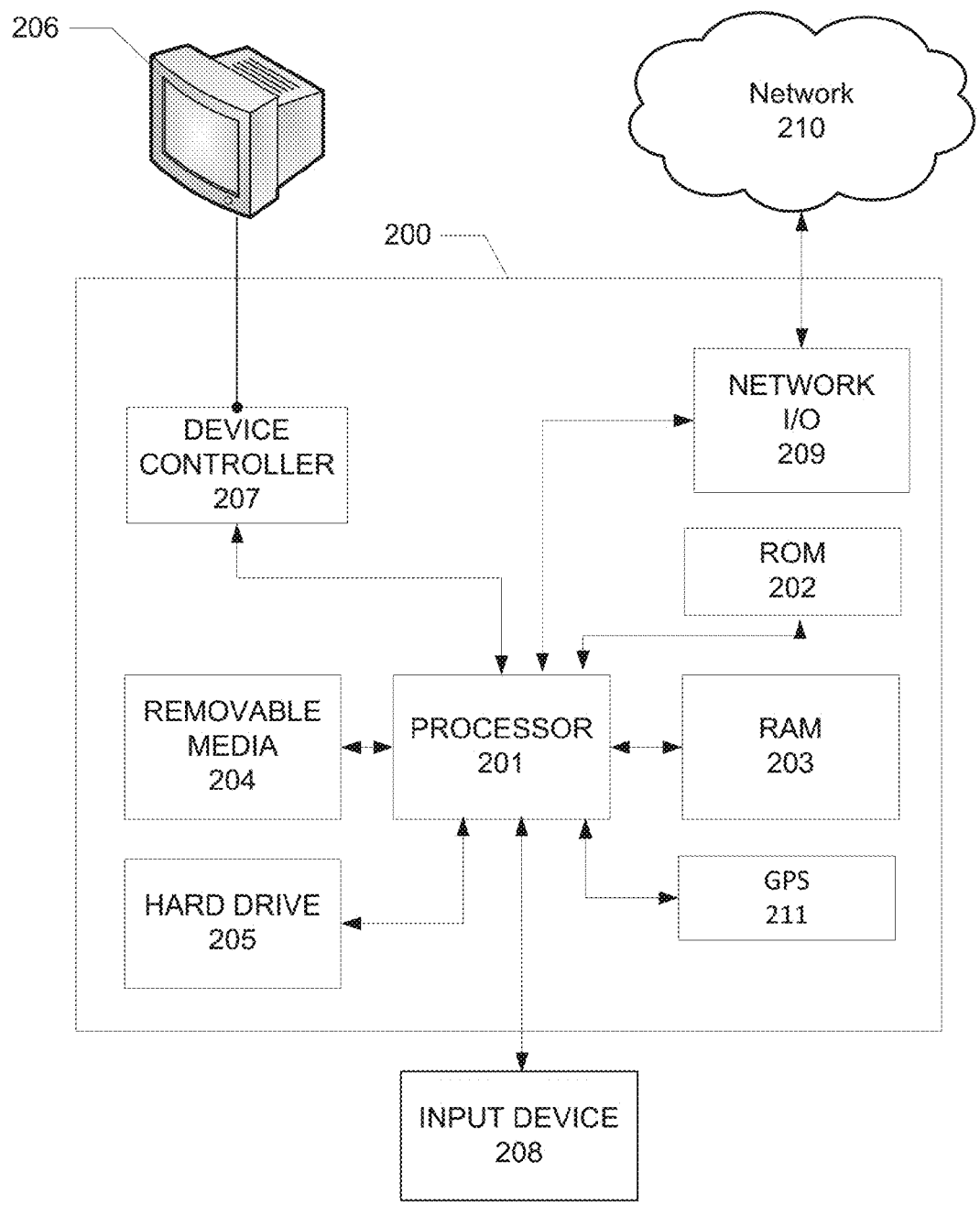
FIG. 2 shows an example computing device that can be used to implement any of the methods, servers, entities, and computing devices described herein.

FIG. 2 shows general elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network I/O circuit 209 may be a wired interface, wireless interface, or a combination of the two. In some embodiments, the network I/O circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

In some embodiments, a media interface may be generated for display by the processor 201 at the computing device 200, which may correspond to a device local to a user, such as the set-box 113 as referenced in FIG. 1. In other embodiments, the media interface may be generated at an application server 107 at a local office 103 as referenced in FIG. 1. In other embodiments, portions of the media interface may be generated at both an application server 107 at the local office 103 and for display by the processor 201 of the computing device 200.

The media interface may be displayed at the display 206. The processor 201 may instruct device controller 207 to generate such a display at the display 206. The processor 201 may receive user input to the media interface from input device 208. The processor 201 may process the user input and implement subsequent features of the personalized media guide to such received user input. The processor 201 may store user media consumption history, media preferences, and/or user profile information in a memory unit such as ROM 202, RAM 203, or the hard drive 205. The processor 201 may additionally identify any media content stored on the hard drive 205 or the removable media 204 and incorporate such locally stored media content into the personalized media guide. If such locally stored media content is requested for playback through the media interface, the processor 201 may retrieve such locally stored media content from the removable media 204 or the hard drive 205 and display the locally stored media content on the display 206.

Additionally, the device may include a location-detecting device, such as a global positioning system (GPS) microprocessor 211, which can be configured to receive and process global positioning signals and determine, with possible assistance from an external server and antenna, a geographic position of the device. The GPS microprocessor 211 may transmit the determined location of the user of the computing device 200 to processor 201. The processor 201 may then use the determined location to further tailor the personalization of the media interface. For example, the processor 201 may identify users in the same location as the user of the computing device 200 that have similar tastes as the user of the computing device 200 based on a consumption history data obtained from an application server 107. The processor 201 may generate content recommendations for the media interface displayed at the display 206 based on the preferences of the identified similar users.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., the processor 201, the ROM storage 202, the display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein. The various computing devices, servers and hardware described herein may be implemented using software running on another computing device.

Figure 3:
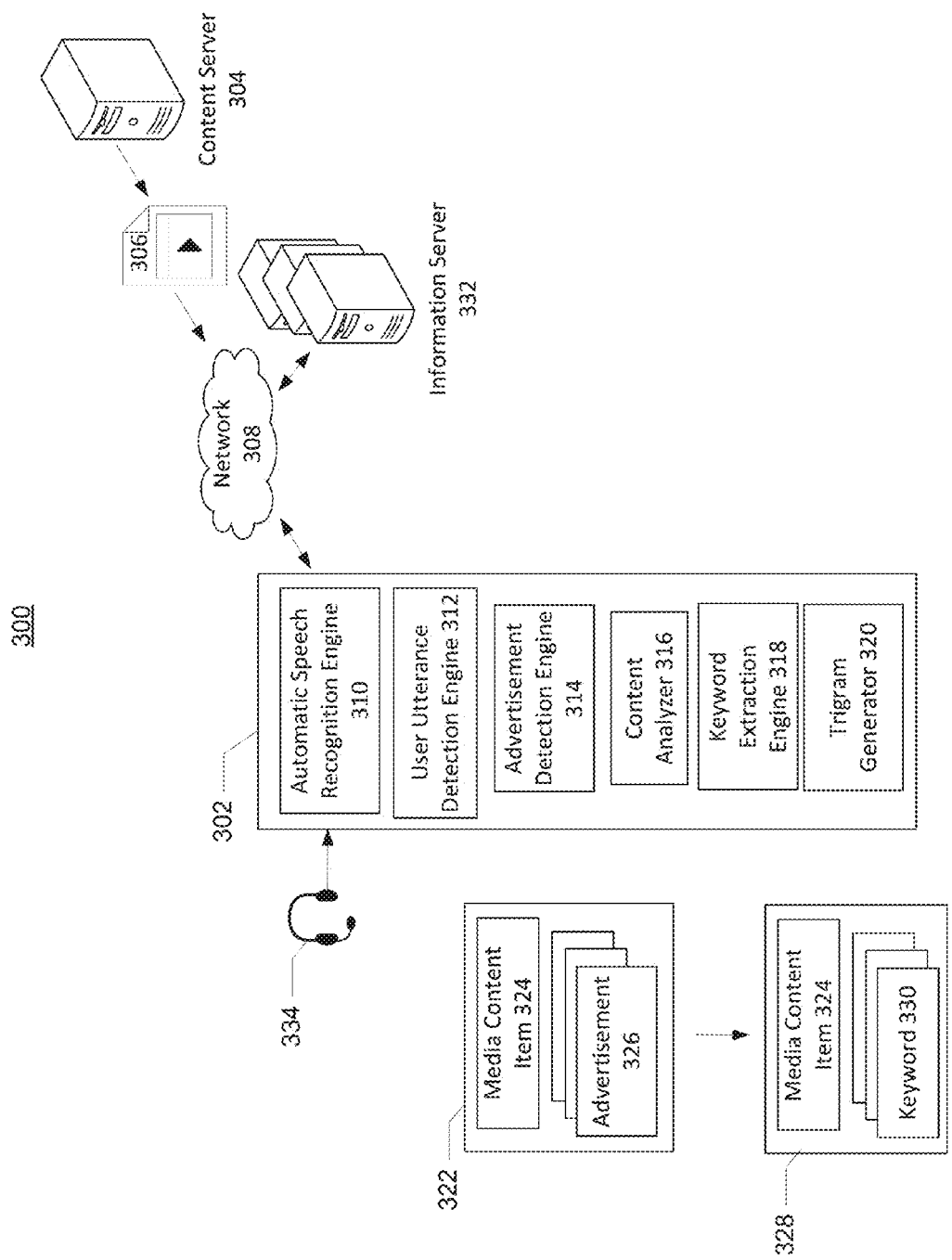
FIG. 3 shows an example media search system on which features described herein may be practiced.

FIG. 3 shows an example media search system 300. The computing device 302 may receive the media content 306 from the content server 304 over the network 308. The computing device 302 may also communicate with one or more information server(s) 332 to search Internet webpages or any files stored on a remote database that are either related to and/or promoting a media content item that is accessible to the media search system 300. For example, the webpage and/or file promoting a media content item may be a webpage devoted to particular media content item such as a webpage for the "Ali G Rezurection" television show. Upon identifying any content related to and/or promoting a media content item on the information server(s) 332, the computing device 302 may gather information related to the corresponding media content from the information server(s) 332. The computing device 302 may also receive user voice inputs from a microphone 334. The microphone 334 may be connected directly to a microphone port of the computing device. Alternatively or additionally, the microphone 334 may a part of another computing device that is in communication with the computing device 302 over a wireless network such as Wi-Fi or Bluetooth. Upon analyzing media content, the computing device may create data structures containing associations between media content and advertisements, such as the data structure 322 between the media content 324 and the advertisement 326. The data structure 322 may be a data structure that links the media content 324 to an advertisement 326 that describes the media content item 324. The computing device 302 may further analyze the advertisements to extract keywords describing the media content that they are promoting. The computing device 302 may generate an association between each media content item and its corresponding keywords such as the association 328 between the media content 324 and the keyword 330.

In some embodiments, the computing device 302 may perform multiple different features of advertisement recognition, parsing and analysis, speech recognition, and/or user utterance analysis. In other embodiments, such functionalities may performed by more than one computing device of a distributed computing environment. In one example embodiment, the automatic speech recognition (ASR) engine 310 and the user utterance detection engine 312 may be executed on one computing device in communication while the advertisement detection engine 314, the content analyzer 316, the keyword extraction engine 318, and the trigram generator 320 may be executed on a second computing device in communication with the first computing device. In another example embodiment, the ASR engine 310, the user utterance detection engine 312, the advertisement detection engine 314, the content analyzer 316, the keyword extraction engine 318, and the trigram generator 320 may be executed on separate computing devices in communication with each other. In other examples, any combinations of these elements may be performed on any number of computing devices. For ease of reference, the features of the present disclosure will be discussed hereinafter as being implemented on a computing device 302.

In some embodiments, the computing device 302 may process voice commands from the microphone 334 to translate spoken words to text input. The ASR engine 310 may receive audio input from the microphone 334. The ASR engine 310 may recognize voice inputs of users from other ambient noises in the audio input and may convert the voice commands to text. For example, if the user says "Find me Da Ali G Show episode where Ali interviews Buzz Aldrin," the ASR engine 310 may recognize that the user has input a voice command to search for a media content item and may convert the audio input of the voice command into text. The audio input may be converted to a text based input as soon as the ASR engine 310 receives the audio input from the microphone 334.

In some embodiments, the computing device 302 may detect user utterances from an audio input received from a user. A user utterance may be a portion of the voice command to search for a media content item. For example, "Da Ali G Show" and "Ali interviews Buzz" may be two user utterances present in the voice command "Find me Da Ali G Show episode where Ali interviews Buzz Aldrin." Additionally or alternatively, the user utterance may be detected separately from voice commands. The user may be describing a particular media content item without issuing a voice command to search for a media content item. For example, the user may be describing his favorite programs to customize the media search system 300 to recommend relevant media content items. If the user states "I like the Ali G Show where Ali interviews Buzz Aldrin," the computing device 302 may detect the user utterances of "Ali G Show" and "Ali interviews Buzz Aldrin" in the user's voice input even though the user's voice input is not a voice command since the voice input does not use words such as "find me" or "show me" that are typical of voice commands. The computing device 302 may, however, identify the detected user utterances from such a user voice input to identify the media content item that the user is referring to in order to perform the intended task for which the voice input was received (e.g., improve the media search system 300's media content recommendation algorithm). Such user utterances may be converted to text using a speech to text conversion algorithm.

In some embodiments, the user utterance detection engine 312 may process the text translated version of the audio input to identify the separate user utterances in a continuous stream of audio input received from the user. The user utterance detection engine 312 may identify if a user is searching for particular media content from other times the user is talking about something that is not related to searching for media content. The user utterance detection engine 312 may identify if a user has mentioned a particular media content item and may identify and store all the other user utterances that the user mentions in relation to that media content item. The user utterance detection engine 312 may be configured to monitor the translated speech-to-text input stream generated by the ASR engine 310 to identify if a user is talking about a media content item. For example, the user utterance detection engine 312 may continuously monitor a text stream outputted from the ASR engine 310 for specific phrases that the user uses to refer to media content items such as "show," "television," "series," "episode," "the one where," etc. Detection of any of these phrases may trigger the user utterance detection engine 312 to determine that the user is talking about a particular media content item. For example, the user utterance detection engine 312 may identify from the received voice command "Find me Da Ali G Show episode where Ali interviews Buzz Aldrin," that the terms "Show" and "episode" are included in the voice command. Accordingly, the user utterance detection engine 312 may identify that the user is talking about a media content item. Once the user utterance detection engine 312 identifies that the user is talking about a particular media content item, the user utterance detection engine 312 may identify phrases that the user uses to refer to the media content the user is searching for. For example, the user utterance detection engine 312 may identify that the media content items. The user utterance detection engine 312 may monitor the translated speech to text stream and may store words and/or phrases from the translated speech to text stream for each media content item that the user mentions. If the user says "the Rezurection episode where Ali G interviews an astronaut," the user utterance detection engine 312 may flag and/or store that portion of the voice input because it contains the phrase "episode where" which are typically used by the user to refer to a media content item. The user utterance detection engine 312 may store such phrases, hereinafter referred to as user utterances, in a memory of the computing device 302 to be relied upon for searching through the metadata of different media content items in search of a matching media content item.

In some embodiments, the computing device 302 may detect an advertisement within the media content 306. For example, the media content 306 may be a continuous media stream that includes advertisement segments in between segments of the media content item. The advertisement detection engine 314 may be able to detect when an advertisement begins and ends in such a continuous media stream. The advertisement detection engine 314 may receive a continuous stream of programming from the content server 304 and accordingly, the advertisement detection engine 314 may be able to detect which portions of the continuous stream of programming are advertisements. For example, the advertisement detection engine 314 may analyze the metadata of various different segments of the media content 306 received from the content server 304 to determine whether there are any identifiers indicating whether a given segment of the media content 306 is a media content item or an advertisement. Additionally or alternatively, the advertisement detection engine 314 may be able to detect advertisements in a broadcast media stream from a content server 304 by detecting the length of the programming, or identifying segments of programming based on scene changes, the presence of blank frames that often begin and end a commercial, changes in audio level, or any other desired technique for identifying different segments in a continuous media stream. The advertisement detection engine 304 may be able to determine that if the media content lasts no longer than thirty seconds and may be positioned in the stream back to back with another such short duration media content, then the media content is an advertisement. Additionally or alternatively, the advertisement detection engine 314 may detect advertisements by detecting change in average volume of audio levels of the media content. If the audio volume is significantly higher for short duration media content than its surrounding media content in a continuous media stream, the advertisement detection engine 314 may identify the media content as an advertisement. The advertisement detection engine 314 may also monitor the video and closed caption content of the media content to determine if there is continuous mention to a particular brand or media content indicating that the advertisement is promoting such a brand of media content. Once the advertisement detection engine 314 has identified an advertisement in the media content 306, the advertisement detection engine 314 may mark the start and end times of each advertisement in media content 306. The advertisement detection engine 314 may store (e.g. in a memory of the computing device 302) a data structure including an association (e.g., table or any other data structure) of all identified advertisements related to a particular media content item and their associated start and end times for future reference. Additionally or alternatively, the advertisement detection engine 314 may generate advertisements separate from media content 306 by extracting the advertisements in the media content 306. Additionally or alternatively, advertisements may be identified from an advertisement server. For example, the computing device 302 may communicate with an advertisement server to find advertisements related to and/or promoting any media content items accessible to the media search system 300. The computing device 302 may analyze any such identified advertisements in an advertisement server to extract keywords to aid in a voice media search for media content according to the embodiments described herein.

In some embodiments, the computing device 302 may determine whether advertisements are promoting a media content item or whether they are unrelated to media content accessible to media search system 300. The content analyzer 316 may analyze the audio and video data of the media content that has been identified as an advertisement, by the advertisement detection engine 314, to determine whether each identified advertisement is describing and/or promoting a media content item. The computing device 302, and in particular the content analyzer 316, may extract text from advertisements and analyze the extracted text to determine whether the extracted text includes terms describing any media content items. If the advertisement is a video or an audiovisual commercial, the computing device 302 may process the video component to extract any text present in the advertisement in order to perform such a text analysis. For example, the content analyzer 316 may perform optical character recognition (OCR) on each video frame of each identified advertisement to identify any text displayed in the advertisement. The content analyzer 316 may also retrieve closed caption information associated with each advertisement to identify terms used in the advertisement. If the advertisement is an audio commercial (e.g., radio, or online radio commercial) or is an audiovisual commercial with an audio component, the computing device 302 may translate the audio component of the advertisement into a text stream to identify any terms indicating that the advertisement is related to and/or promoting a media content item. For example, the content analyzer 316 may instruct the ASR engine 310 to process each identified advertisement's audio portion to generate a text transcript of the advertisement using speech recognition techniques. Text extracted from performing OCR on the video frames of an audiovisual and/or video advertisement, text obtained from the closed caption information of advertisements, and text obtained from processing an audiovisual and/or audio advertisement's audio component using speech recognition algorithms may be compiled into a text transcript of the advertisement that may be analyzed to determine whether the identified advertisement is promoting a media content and also to extract keywords from the advertisement.

After text from the audio and video signals of an identified advertisement has been generated, the content analyzer 316 may analyze such text to determine if the advertisement is related to any media content item. For example, the content analyzer 316 may communicate with one or more information servers 332 to identify media content information such as media guide data that include titles of media items and series, names for different media sources (e.g., broadcast channels and on-demand providers), actor names, and other such media content information that describes a media content item. The content analyzer 316 may examine each advertisement (e.g., the generated text transcript of an advertisement) for mentions of such media content information to determine whether each advertisement is describing a media content item or not. The content analyzer 316 may associate each advertisement promoting a media content item with that media content item. The content analyzer 316 may generate one or more data structures including an association such as the data structure 322 that links a media content item 324 with all related advertisements that describe and/or promote the media content item 324. For example, the content analyzer 316 may determine that the advertisement 326 contains an audio portion. When the audio portion is translated into text by the ASR engine 310, the content analyzer 316 may detect that advertisement 326 includes mentions of terms such as "Ali G Rezurection" and "FXX." Upon communicating with one or more information servers 332, the content analyzer 316 may determine that the term "FXX" describes a content source and that the term "Ali G Rezurection" describes a television show. Accordingly, the content analyzer may determine that the advertisement 326 is related to and/or promotes the "Ali G Rezurection" media content item 324. Accordingly, the content analyzer 316 may generate the data structure 322 to include an association between the media content item 324 and the advertisement 326. Such a data structure 322 that includes such an association may be stored in memory of the computing device 302 or in a separate computing device. The advertisements that the content analyzer 316 has determined do not relate to any media content items may be excluded from a data structure such as the data structure 322 associating media content items with advertisements.

As discussed above, the content analyzer 316 may process the text transcript to determine, for example, that there are many references to "Ali G" in the advertisement, and that the advertisement is likely to be an advertisement for the "Ali G Rezurection" media content item. Another component, the keyword extraction engine 318, may process the text transcript of advertisements to determine what kinds of keywords are used to describe the "Ali G Rezurection" media content item. For example, words such as "Sacha Baron Cohen," "Da Ali G Show," "Borat," and "Buzz Aldrin" may be used in an advertisement 326 that promotes a particular episode of the "Ali G Rezurection" television show series (e.g., media content item 324). The keyword extraction engine 318 may extract words used in advertisement 326 such as such as "Sacha Baron Cohen," "Da Ali G Show," "Borat," and "Buzz Aldrin." The keyword extraction engine 318 may receive the generated text transcript of each advertisement and analyze the text transcript to extract keywords. The keyword extraction engine 318 may ignore articles of speech, pronouns, conjunctions, and/or commonly used words in extracting keywords from the text transcripts of each advertisement. The keyword extraction engine 318 may be programmed with specific rules that govern how to extract keywords (e.g., to identify and extract names of television channels and names of movies, television shows, and music, actor names, etc.). The keyword extraction engine 318 may communicate with the information servers 332 to identify such media content information (e.g., names of television channels and names of movies, television shows, and music, actor names, character names, etc.) in order to know which words from the text transcript of advertisements to extract. For example, after the audio portion is translated into text by the ASR engine 310, the keyword extraction engine 318 may detect that the audio portion of advertisement 326 includes mentions of terms such as "Ali G." Upon communicating with one or more information servers 332, the keyword extraction engine 318 may determine that the term "Ali G" refers to a name of a character on the "Ali G Rezurection" television show series and may extract this as a keyword. The keyword extraction engine 318 may be configured to place an emphasis on extracting proper nouns and to avoid extracting duplicate words from the transcript. For example, the keyword extraction engine 318 may extract the term "Buzz Aldrin" as the keyword 330 from the audio portion of the advertisement 326 upon determining that Buzz Aldrin is a proper noun. Keywords may be extracted from the advertisements 326 that have been associated with each media content item 324. The computing device 302 may extract keywords from each of the multiple advertisements 326 to generate the keywords 330 that the computing device 302 may store in a memory unit, either locally on the computing device 302 or remotely in an information server 332. The computing device 302 may generate an association 328 between the media content item 328 and the keywords 330.

The computing device 302 may search for additional sources of keywords and content describing media content items. By gathering keywords from multiple different sources for each media content item, the media search system 300 may capture different possible ways that people, especially the end users of the media content items, refer to the media content items. By searching through different online social networks for mentions of various media content items, the media search system 300 may capture keywords from posts in which one or more media content items are referred to. The computing device 302 may analyze such posts to extract keywords used by people to refer to such media content items that are different from conventional keywords associated with the media content items from a media provider. By incorporating such keywords into the metadata searched for each media content item during a media search, the media search system 300 may improve the media search process. The computing device 302 may search for promotional content describing media content items on the Internet or in a database stored on a local network of the computing device 302 or on a network located remotely from the computing device 302. For example, the computing device 302 may search for feeds related to each particular media content item that the media search system 300 has access to. Such feeds may be provided by media content providers such as the content server 304 and/or be part of a social networking website such as Twitter or Facebook. For example, keywords describing the media content may be extracted from online social networking services such as Twitter and/or Facebook. For example, messages posted on such online networking services may include a metadata tag such as a hashtag that may be used to identify which messages to parse to extract keywords for a media content item. For example, messages or posts on Facebook or Twitter with a metadata tag "#AliG" may be used to extract keywords about the media content item titled "Ali G Rezurection." In some embodiments, the keyword extraction engine 318 may analyze any feeds received from the content server 304 to identify if such feeds describe any media content items and if so, identify keywords from the description of each media content item. For example, the keyword extraction engine 318 may extract keywords from a feed provided by the content server 304 describing the media content item 324. The keyword extraction engine 318 may supplement the keywords 330 with such keywords extracted from the feed. By doing so, such keywords extracted from the feed may be associated with each media content 324 in a data structure 328.

Although advertisements are described throughout this disclosure as source of information from which to extract keywords describing media content, any media content may be analyzed to obtain keywords describing another media content. To comprehensively understand how people talk about a particular media content, content from television shows, movies, user comments on online webpages related to the media content, user speech detected from a microphone of a media consumption device, may be analyzed to detect keywords that may be included as metadata describing media content items.

In some embodiments, keywords generated from user utterances (e.g., words and/or phrases detected from a user's voice input into the computing device 302) may be stored in a media content item's metadata. The content analyzer 316 may analyze user utterances identified by the user utterance detection engine 312 to identify which user utterances are related to media content items. By detecting words related to media content items that the content analyzer 316 is configured to detect from a speech to text translation of the user's voice input, the content analyzer 316 may identify that certain user utterances may be describing a particular media content item. User utterances that the content analyzer 316 may have identified to describe a particular media content may be processed by the keyword extraction engine 318 to identify keywords describing a media content item from such user utterances. For example, the system 300 may query a user to identify which shows the user prefers and/or any particular shows that the user would like to see similar shows to. In response if the user responds with a user utterance such as "I liked the Ali G Rezurection episode where Ali G interviews Buzz Aldrin," the content analyzer 316 may identify that the user is talking about the "Ali G Rezurection" media content series by identifying that the phrase "Ali G Rezurection" refers to media content accessible to the media search system 300. The content analyzer 316 may further identify that user utterances "Ali G interviews Buzz Aldrin" may refer to an episode of the "Ali G Rezurection" television show and may extract keywords such as "Ali G" and "interviews," and "Buzz Aldrin" from the user utterance to tag the metadata of a "Ali G Rezurection" media content item.

In some embodiments, the computing device 302 may extract keywords by analyzing the text translated voice command inputs for improved media content search in the future. For example, if the user says "Find me the episode where Ali G interviews Buzz Aldrin," the content analyzer 316 may analyze that voice command input and conduct a media search. Once the media search identifies that the media content item 324 is the search result corresponding to the user voice command, the computing device 302 may include the phrases "Ali G," "interviews," and "Buzz Aldrin" extracted from the voice command input in the metadata for the media content item 324 as keywords describing the media content item 324. Adding such keywords to the metadata for media content items after a media search has been conducted may enhance the degree of confidence in a media search if a future voice command input for the media content item 324 includes a different search phrase with one or more of the keywords extracted in this manner.

The keyword extraction engine 318 may store keywords extracted from user utterances for a particular media content item in the metadata of that particular media content item. For example, the keyword extraction engine 318 may associate keywords extracted from user utterances describing the media content 324, such as the keywords 330, with the media content 324 and store such an association in the data structure 328. The computing device 302 may store such a data structure 328 in a memory unit.

In some embodiments, associations such as those in the data structure 328 between media content items and extracted keywords may be included in each media content item's metadata. For example, the computing device 302 may store associations such as the association between the media content item 324 and the keyword 330 that is present in the data structure 328 for in the metadata for the media content item 324. The metadata may include data identifying the associations, keywords such as the keyword 330 extracted from advertisements and/or media content describing the media content item, and user utterances related to the media content item.

The computing device 302 may store such data structures for each media content item accessible to the media search system 300 in the respective media content items' metadata. Keywords extracted from advertisements may be included in the metadata that already describes each media content item. Keywords such as the keywords 330 may be included in the metadata that is used to search for media content items if a user initiates a text or voice command search.

In some embodiments, trigrams may be generated from the keywords 330 that are extracted from advertisements and media feeds. For example, a trigram generator 320 may generate various clusters of three keywords, hereinafter referred to as a keyword trigram. The three keywords that are used in each keyword trigram may be selected from a list of all keywords associated with a given a media content item 324. Various different combinations and/or permutations of three keywords associated with a particular media content item may be selected to generate such keyword trigrams. Keyword trigrams may be generated by examining keyword phrases. For example, for a keyword phrase "Da Ali G Show," a word level trigram of "Da Ali G" or "Ali G Show" may be generated. Alternatively or additionally, words from multiple keyword phrases may be used to generate a word level keyword trigram. For example, a keyword phrases "Da Ali G Show" and "Rezurection" may be used to generate a keyword trigram "Ali G Rezurection." Such keyword trigrams may be stored along with media content metadata in order to effectively search for media content items with voice commands. In some embodiments, the trigram generator 320 may generate keyword trigrams by selecting keywords that are found nearby one another in the original source from which the keywords have been extracted. For example, the trigram generator 320 may detect that the keywords "Borat," "interviews," and "Buzz" occur near each other in an original feed from which they have been extracted (e.g., Twitter feed for the Ali G Rezurection media content series). By detecting that such keywords appeared originally as a phrase "Tonight, watch Borat interview Buzz Aldrin on Ali G Rezurection," the trigram generator 320 may determine that the keywords "Borat," "interviews," and "Buzz" are originally located near one another and may cluster them together to generate a word level trigram (e.g., "Borat interviews Buzz").

Trigrams may be used in the media search system 300 to improve the accuracy of search results to a user voice command to search for media assets. By resolving the text translated voice command into trigrams and using such voice command trigrams to search against a database of keyword trigrams that have been generated for keywords describing each media asset, the accuracy of a voice media search may be improved. In some embodiments, the keywords describing each media content item may be broken down into clusters of three characters, hereinafter referred to as character level keyword trigrams. Any cluster of three characters may be hereinafter referred to as a character level trigram, whereas any cluster of three words may be a word level trigram. The trigram generator 320 may generate character level trigrams from each keyword 330. Three consecutively placed characters from each keyword 330 or keyword phrase may be selected to generate a character level trigram comprising three characters that preserve the ordering in which such characters are placed in the original keyword or keyword phrase. For example, from the keyword phrase "Da Ali G Show," the following character level trigrams may be generated: Da_, _Al, Ali, i_G, Sho. By generating character level trigrams, the trigram generator 320 may determine which character combinations of keywords should be used to generate trigrams and which combinations should not be used. For example, while the trigram generator 320 may generate the character level trigram "Ali," it may not use the character combination of "_G_" to generate a trigram because such a combination may not be determined to be of much value in identifying or characterizing a media content item. In some embodiments, the trigram generator 320 may be configured to ignore spaces in keyword phrases and include three alphabetic characters when generating character level trigrams. For example, the trigram generator 320 may generate the character level trigram "li_G" from the keyword phrase "Da Ali G Show" by ignoring the space character between "li" and "G" in the keyword phrase "Da Ali G Show" and only selecting three consecutively placed alphabetic characters in that phrase. However, the trigram generator 320 may maintain the space character in the character level trigram between the "li" and "G" even though it yields four total characters in the trigram. In another implementation, the trigram generator 320 may remove the space character in the generated character level trigram, resulting in the character level trigram "liG" having only three characters that are each alphabetic characters. In some embodiments, the word level trigrams and character level trigrams generated from advertisements, media feeds, and user utterances describing a particular media content item may be included in the search metadata for the respective media content item. Such metadata may allow the user to search for media content items by describing media content items in a natural manner instead of having to remember the names and titles of episodes, media series, actors, or channel names to perform a media search.

While trigrams may be generated for the various media content items' metadata, trigrams may also be generated for user utterances and/or other user voice inputs. By generating trigrams for both user voice inputs and for keywords stored in a media content items' metadata, the computing device 302 may be able to perform a media content search by searching through keywords in the metadata of various media content items using the trigrams generated from the text translated user voice input. The trigram generator 320 may identify user utterances generated from a voice input received from the user. The trigram generator 320 may receive as inputs, user utterances generated from the user utterance detection engine 312, and may generate word level trigrams and character level trigrams of these received user utterances. Such user utterance trigrams may be used to search for media content items as described further below with relation to FIG. 4. The user utterance trigrams for user utterances that describe a media content item may be grouped along with other keyword trigrams describing that media content item.

Although the embodiments described in this disclosure have been described in the context of trigrams, any sized n-grams may be used in the place of trigrams for word level and character level n-grams. Trigrams may be preferred over other n-grams for certain applications such as media content item names and descriptions. The computing device 302 may be configured to use a different size n value. For example, the computing device 302 may use bigram (cluster of two) or quadgram (cluster of four) words or characters in the media search process. The computing device 302 may determine based on the average character and/or word count of each of the keywords stored for the media content items in the media search system 300 that trigrams may be the most efficient size n-grams to use for searching through such keywords to find a matching media content item in a voice search. In some embodiments, if the average character count and/or word count of each of the keywords in media search system 300 is smaller than the average character count and/or word count of each of the keywords for which a trigram convention is used, the computing device may be configured to use bigrams instead.

Figure 4:
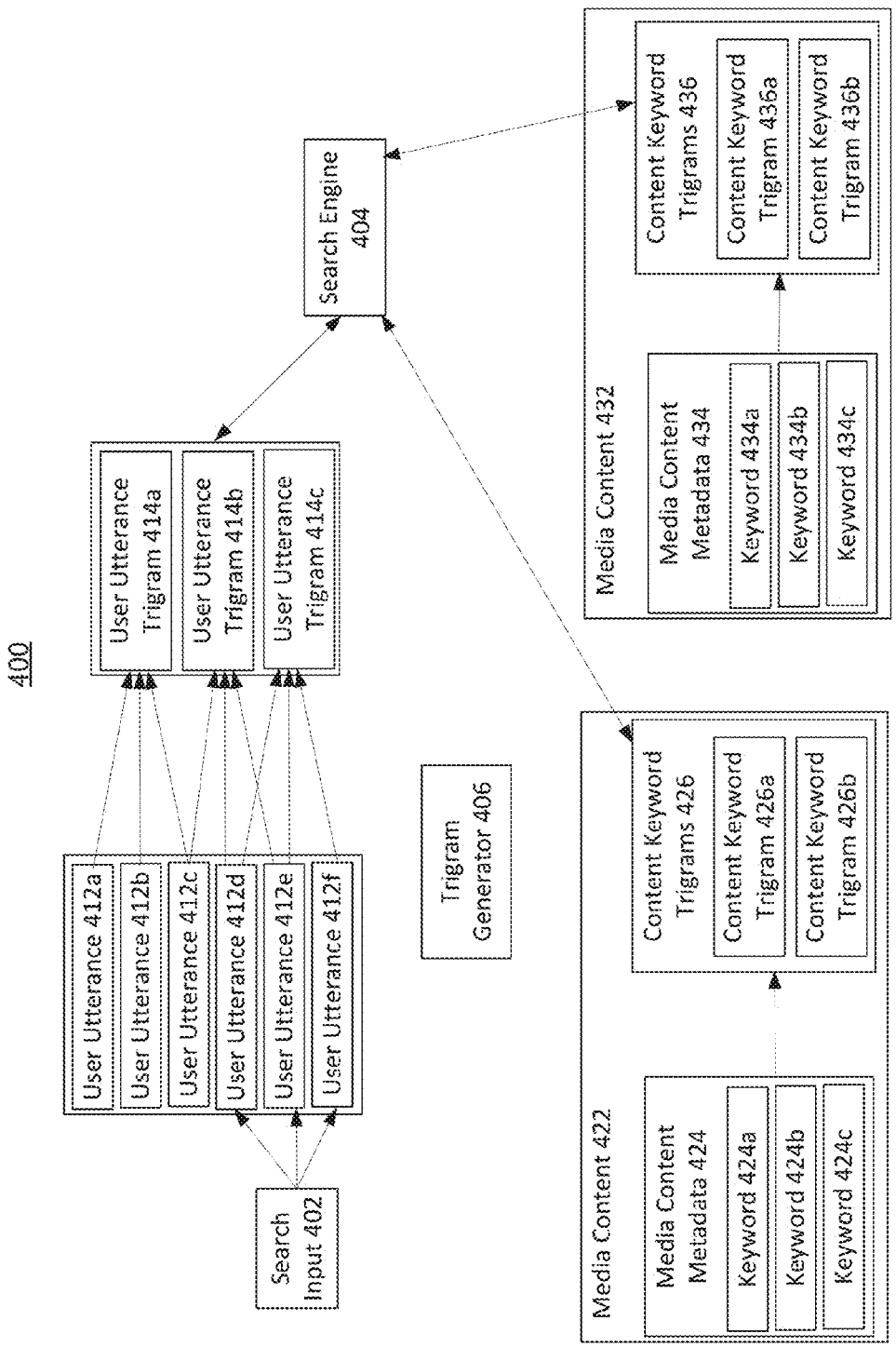
FIG. 4 shows various data structures that may be generated according to the features described herein.

FIG. 4 shows various data structures that may be generated to facilitate the natural language search for media content items in a media content search system 400. As described in FIG. 3, an initial set of keywords describing a media content item may be generated before a voice search for media content is conducted. For example, the trigram generator 406 may generate content keyword trigrams such as the content keyword trigrams 426 and 436 for the different media content items 422 and 432, respectively before search input is received from a user. Media content items such as the media content items 422 and 432 may have media content metadata associated with them, such as the media content metadata 424 and 434. By finding advertisements, feeds, and parsing additional content describing media content items, keywords and content keyword trigrams may be generated for various different media content items and included in the metadata of such media content items. Such initial preprocessing of media content keywords and content keyword trigrams may occur before a search input is received from a user. When a user inputs a voice command, such as search input 402, to perform a media search, the voice command may be translated into text and user utterances such as the user utterances 412a, 412b, 412c, 412d, 412e, and 412f may be generated from the text translation of such a search input received from a user. User utterance trigrams such as the user utterance trigrams 414a, 414b, and 414c may be generated from the user utterances 412a-f by a trigram generator 406. In order to implement a voice command search for media content items, a search engine 404 may search content keyword trigrams using user utterance trigrams to find a match between a media content item and the search input 402 received from a user. A voice command input including the search input 402 may be received from the user in step 614 of method 600, discussed further below with regard to FIG. 6A.

The user utterances 412a-f may be generated from a search input 402. As described in connection with step 616 of method 600 described in FIG. 6A below, a voice command search input 402 may be processed into a text stream by an ASR engine such as the ASR engine 310 as described above with relation to FIG. 3. The text stream may be analyzed to determine separate user utterances that each describe a media content item. In the example shown in FIG. 4, the user utterances 412a-f are generated by monitoring the text stream generated from voice commands comprised by the search input 402. The user utterances 412a-f may be saved in a memory unit of the media content search system 400 in response to determining that such user utterances describe a media content item. For example, the user utterances 412a-f may be extracted from the text stream generated from the user input 402 upon determining that such words are uttered in the same context as a media content item that the media content search system 400 supports. By comparing certain words in the text stream against a library of search terms known to be media content search keywords, text from the search input 402 may be identified to be related to media content searches. By determining all of the words related to each such identified text in the search input 402, each of the user utterances 412a-f may be identified as being user utterances related to a media content search. In some embodiments, each user utterance may include a single phrase that represents a user search for a particular media content item. In the example shown in FIG. 4, each user utterance in the user utterances 412a-f may be related to a single media content item. For example, each user utterance may be a phrase that the user utters to describe a media content item that the user is searching for. In some other embodiments, each user utterance may be related to a different media content item than another user utterance.

In some embodiments, user utterance trigrams such as the user utterance trigrams 414a-c may be generated from the user utterances 412a-f. Such user utterance trigrams may be generated in step 618 of method 600, discussed further below with regard to FIG. 6A. In the example embodiment shown in FIG. 4, multiple user utterances may be used to generate each user utterance trigram. In the example shown in FIG. 4, each user utterance 412a-f may comprise one or more words. The user utterance trigram 414a may be a word level trigram generated by combining terms from the user utterances 412a-c. Similarly, the user utterance trigrams 414b and 414c may combine terms from the user utterances 412c-e and the user utterances 412d-f, respectively. Such user utterance trigrams may be used by the search engine 404 to search for media content items. The search engine 404 may compare user utterance trigrams with content keyword trigrams such as the content keyword trigrams 426 and 436 to determine that there is a match between what the user is searching for and a media content item.

Each media content item may have associated metadata stored in the memory unit of the media content search system 400. For example, in the example embodiment shown in FIG. 4, the media content items 422 and 432 may have the media content metadata 424 and 434, respectively stored in such a memory unit. The media content metadata 424 may comprise multiple keywords such as the keywords 424a, 424b, and 424c, which may have been stored after being extracted from advertisements, media feeds, or the user utterances describing media content 422. Similarly, the media content metadata 434 may comprise multiple keywords such as the keywords 434a, 434b, and 434c, which may have been stored after being extracted from advertisements, media feeds, or user utterances describing the media content 432. The trigram generator 426 may generate the content keyword trigrams 426 and 436 from the media content metadata 424 and 434, respectively. The content keyword trigrams 426a and 426b may be word level trigrams and/or character level trigrams of the keywords 424a, 424b, and/or 424c. Similarly, the content keyword trigrams 436a and 436b may be word level trigrams and/or character level trigrams of the keywords 434a, 434b, and/or 434c.

In order to search for media content items that the user may be searching for, the metadata for each media content may be searched using user utterance trigrams. For example, the search engine 404 may search trigrams of content keywords such as the content keyword trigrams 426a, 426b, 436a, and 436b using the user utterance trigrams 414a-c. Such a search may be performed in step 620 of method 600, discussed further below with regard to FIG. 6A. The search engine 404 may determine that there is a match after a threshold number of matches between user utterance trigrams and content keywords trigrams for a given media content is reached. Once such a threshold number of trigram matches is reached, the search engine 404 may determine that the manner in which the matching media content item is described in advertisements, media feeds, and/or user utterances matches the manner in which the user has described the desired media content item. Accordingly, a trigram match between user utterance trigrams and content keyword trigrams generated from metadata of each media content item may allow a user to search for media content items in a more natural way instead of having to rely on a keyword match for the title of the media content item or media series or channel number, each of which the user may not know.

Figure 5:
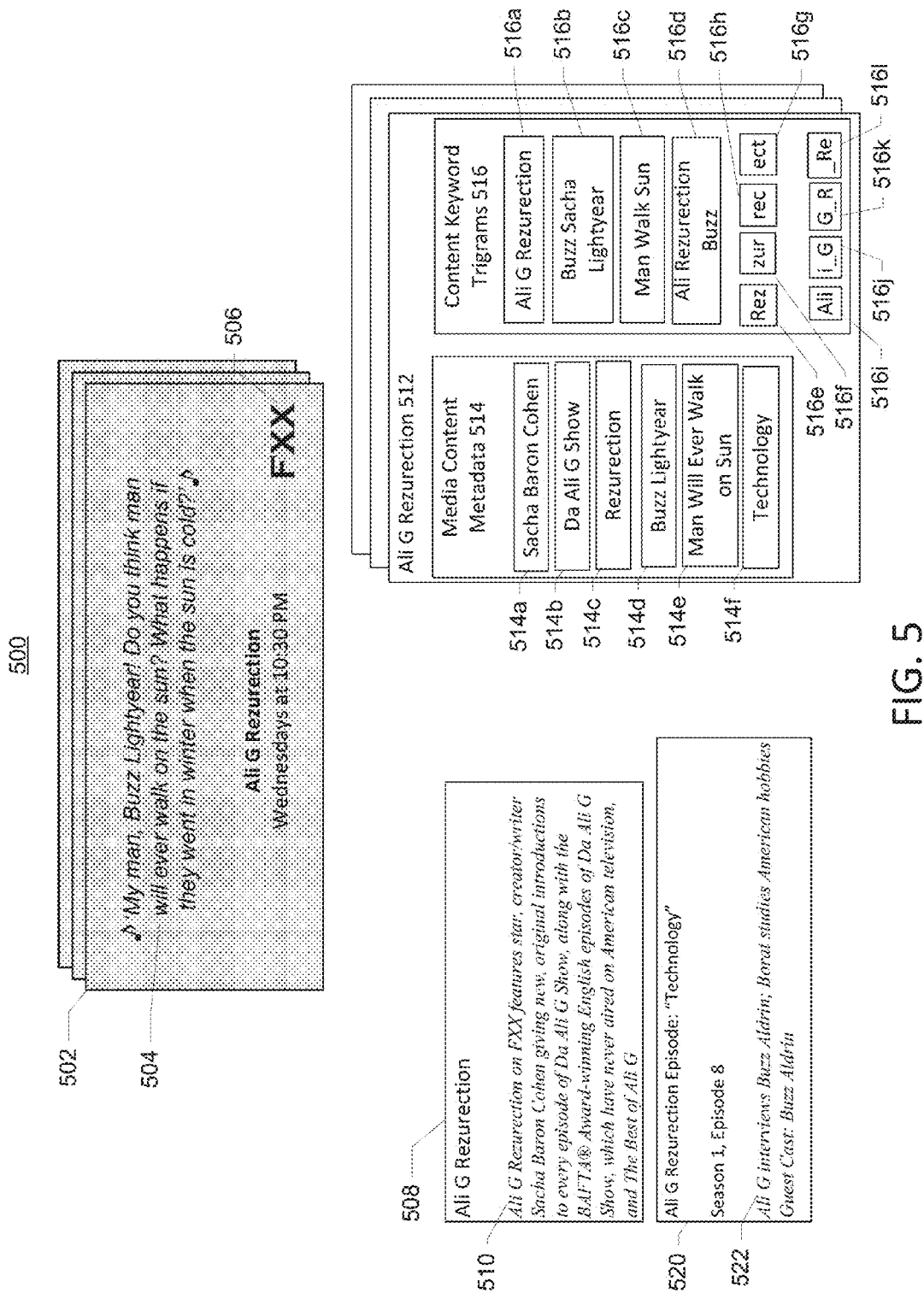
FIG. 5 shows an example advertisement being analyzed by the media search system to generate data structures to improve media content searches according to features described herein.

FIG. 5 shows an example media search system 500 with an example advertisement 502. The advertisement 502 may be a commercial displayed during a television program or other video program, an advertisement on an Internet page, an advertisement sent or received in an email, a printed paper or poster advertisement being scanned, etc., being analyzed by a media search system 500 to identify additional keywords or phrases that should be recognized as referring to the "Ali G Rezurection" show. The media search system 500 may identify the advertisement 502 from either an advertisement database or from a linear media content stream. Such an advertisement may be identified in step 602 of method 600, discussed further below with regard to FIG. 6A. The media search system 500 may identify media content advertisements, such as a television program advertisement, a movie advertisement, etc., as opposed to other types of advertisements that do not promote a media content item accessible to the media search system 500.

In some embodiments, the media search system 500 may search for advertisements promoting media content items. The media search system 500 may identify an advertisement 502 from an advertisement database or it may identify the advertisement 502 from a linear stream of media content broadcast from a media content server to a user device. For example, a computing device such as the computing device 302 of FIG. 3 may detect that a portion of a linear media stream received from a media content server may include one or more advertisements. Advertisements may be detected by analyzing the metadata and/or closed caption information associated with the media content for identifiers indicating the presence of an advertisement. Advertisements may be detected by analyzing volume levels and durations of media clips in the linear media stream. Once the advertisement has been identified, start and end times of each advertisement in the media content linear stream may be identified and noted in a memory of the computing device.

The advertisement 502 may be selected upon determining that the advertisement 502 is an advertisement promoting a media content item, such as a television program advertisement, a movie advertisement, etc. as opposed to advertisements for products that are not media content items (e.g., advertisements for medicines, consumer products, etc.). The audio signal 504 of the advertisement 502 may be converted to a text transcript using an ASR engine. A content analyzer of the media search system 500 may analyze the audio signal 504 of the advertisement 502 and identify the script of the advertisement 502. For example, the content analyzer of the media search system 500 may identify portions of the audio transcript of the advertisement 502 that describe and/or promote a media content item (e.g., a television program, movie, etc.).

In some embodiments, the advertisement 502 may include text describing the name of the media content item that the advertisement 502 is promoting. If the name of the media content item that the advertisement 502 is promoting is included in the advertisement 502, the media search system 500 may identify the text describing the name of the media content item and may associate the advertisement 502 with that media content item. The advertisement 502 may include the on-screen graphic 506 such as channel identifiers that may comprise information identifying one or more characteristics of the media content that the advertisement 502 is promoting and/or the advertisement itself. The on-screen graphics 506 may describe which channel the advertisement 502 may be received on by the user. Such on-screen media identifiers, along with text in the advertisement 502 that may identify the name of the media content item it is promoting may be used to identify which media content item the advertisement 502 may correlate to. Once the advertisement 502 has been identified to promote a particular media content item, the advertisement 502 may be associated with the particular media content item. Such determination of whether an advertisement describes and/or is related to a media content item may be performed in step 604 of method 600, discussed further below with regard to FIG. 6A.

In some embodiments, the advertisement 502 may not include the name of the media content item that it is promoting. In order to identify whether the advertisement 502 is related to any media content items, the advertisement 502's on-screen media identifiers, text transcript of the advertisement audio, and closed captions may be used to identify which media content item the advertisement 502 may correlate to. For example, by analyzing the on-screen graphic 506, and comparing it to a pre-stored database of graphics and logos commonly used with media items and/or providers, it may be identified that the particular media content that the advertisement 502 is promoting may be broadcast on FXX. The advertisement's audio component may also be analyzed by the content analyzer for words and/or sounds that are commonly used by media items and/or providers by searching a pre-stored database of audio samples used with media items and/or providers. By further analyzing the audio signal 504 of the advertisement 502, a content analyzer may determine that the advertisement 502 includes an audio signal with the name of the media content item Once the advertisement 502 has been determined to be related to a particular media content item that is accessible to the media search system, the advertisement 502 may be analyzed for keyword extraction. For example, the text transcript of the advertisement 502's audio 504 may be analyzed to identify keywords that describe the media content item that the advertisement 502 promotes. Such text extraction from advertisements and identification of keywords from the extracted text may be performed in steps 606 and 608, respectively, of method 600, discussed further below with regard to FIG. 6A. From such a text transcript of the advertisement, content keywords may be generated which may be used to search for the media content item. Once the media content item that the advertisement 502 may be promoting has been identified, keywords extracted from the advertisement 502 may be used to supplement the metadata of the identified media content item. In the example shown in FIG. 5, the keywords 514c, 514d, and 514e may be extracted from the text transcript of the advertisement 502's audio. For example, a portion of the advertisement 502's audio may include the phrase, "My man, Buzz Lightyear! Do you think man will ever walk on the sun? What happens if they went in winter when the sun is cold?" By analyzing such a phrase from the audio 504's text transcript, the keyword 514d ('Buzz Lightyear') and the keyword 514e ('Man Will Ever Walk on Sun') may be extracted. Similarly, the audio signal 504 of the advertisement 502 may also indicate that the advertisement 502 is for the show "Ali G Rezurection." Accordingly, the keyword 514c ('Rezurection') may be extracted from the audio signal 504. Such keywords may be extracted from the audio signal 504 by determining that such words are unique to the media content item and therefore may likely describe the media content item. By detecting such keywords, the media search system 500 may identify keywords for inclusion in the media content metadata 514 for the "Ali G Rezurection" episode that the advertisement 502 is describing. By analyzing the transcript of the advertisement 502, the media search system 500 may identify that such keywords 514c-e may be used by users in referring to the "Ali G Rezurection" episode. Accordingly, such keywords 514c-e may be added to the media content metadata 514 that is stored in a memory of the media search system 500. Associating such identified keywords with their corresponding media content items may be performed in step 610 of method 600, discussed further below with regard to FIG. 6A.

In some embodiments, after the media content item that the advertisement 502 is promoting has been identified, additional sources of media information (e.g. websites, media databases, etc.) may be searched to gather additional description of the media content item. Such additional description may be used to extract additional keywords to supplement the media content metadata 514 for the media content item. These webpages may be searched using the identified name of the media content item. For example, by searching an online database or multiple webpages using an online search engine with the title of the media content item that the advertisement 502 may be describing, additional webpages describing the content may be found from which additional keywords may be extracted to supplement the media content metadata 514. For example, upon identifying from the audio signal 504 that the media content item being promoted is "Ali G Rezurection," the media search system 500 may search for additional information on the Internet and/or in media guide databases for media content items titled "Ali G Rezurection," or "Ali G." The media search system 500 may also refine the online search by including keywords identified from the advertisement 502 in the search string. For example, the media search system 500 may add keyword "Buzz Lightyear" to the online search.

Such a database search may result in webpages such as the webpages 508 and 520. The webpage 508 may be an IMDB webpage for the "Ali G Rezurection" media series that results from conducting a search with the title of the media content ("Ali G" or "Ali G Rezurection"). A more refined search using the keywords 514c-e may result in the webpage 520, a webpage for the episode described in the advertisement 520. The webpage 520 may be found after searching an online database with the keywords 514c ('Rezurection') and 514d ('Buzz Lightyear'). By examining the text 510 and 522 found in the webpages 508 and 520, respectively, the media search system 500 may identify additional keywords such as the keywords 514a ('Sacha Baron Cohen'), 514b ('Da Ali G Show'), and 514f ('Technology'). Such additional keywords may be stored in the media content metadata 514 for the particular media content item that the advertisement 502 is promoting.

In some embodiments, trigrams may be generated from the keywords stored as the media content metadata 514. The media search system 500 may generate the content keyword trigrams 516 from the keywords 514a-f stored in media content metadata 514. Such content keyword trigrams may be generated in step 612 of method 600, discussed further below with regard to FIG. 6A. In the example shown in FIG. 5, the content keyword trigrams 516a-d are word level trigrams of the media content keywords 514a-f and the content keyword trigrams 516e-1 are character level trigrams of the media content keywords 514b-c. Such content keyword trigrams 516 may be used in the media search to identify the particular episode of the "Ali G Rezurection" series if a user searches for such a media content item. Certain trigrams may include terms from only one keyword (e.g., the word level trigram 516c uses only terms from the keyword 514e). However, some trigrams may use terms found in multiple different keywords (e.g., the word level trigram 516d uses terms from the keywords 514b, 514c, and 514d). Similarly, character level trigrams may also use characters from different keywords. The character level trigrams 516i-1 are trigrams of the phrase "Ali G Rezurection," a phrase that is a combination of terms from keyword 514b ('Da Ali G Show') and keyword 514c ('Rezurection'). The trigram 516k combines characters from the keywords 514b and 514c.

The media search system 500 may identify keywords for each media content item that it has access to by parsing through advertisements promoting the media content items and online databases describing the media content items. The media search system may accordingly generate clusters of keywords and trigrams for each media content item in this manner. Such clusters may be stored in a memory unit of the media search system 500 for use in performing media searches. Responsive to a user issuing a voice command to search for a media content item, the media search system 500 may search through these different clusters of trigrams and keywords that are associated with each media content item to determine which media content item best matches the user utterances and/or the user utterance trigrams generated from the voice command.

In some embodiments, the media search system 500 may be able to minimize the effects of incorrectly spelled homophones, both in user utterances or in speech recognition processed text transcript of the advertisement 502's audio signal 504. For example, it may be possible that one or more words in the audio signal 504 of the advertisement 502 are incorrectly confused by the media search system 500 with a homophone while generating the text transcript of the audio signal 504. For example, the keyword 514c may be incorrectly spelled as "Resurrection" if the audio signal 504 is speech processed through an ASR engine. Such an incorrect spelling may occur more frequently if the words used in the media content item are less commonly used in everyday language than their homophones. For example, the speech recognition algorithm may mistakenly process "Rezurection" as "Resurrection" because the word "Resurrection" is more commonly used than "Rezurection." Although the word "Rezurection" is the correctly spelled title of the media content item being indexed, speech recognition algorithms may commonly confuse this word with the word "Resurrection." While conventional system may propagate such a confusion in the search process by returning the wrong media content item due to such a mistake in transcription of the media content item title, the media search system 500 may overcome such confusion. For example, most conventional systems may incorrectly tag the episode of "Ali G Rezurection" with the word "Resurrection" and may return "Ali G Rezurection" if the user is searching for a different program named "Resurrection" (a different fantasy drama television show). However, media search system 500 may overcome such confusion by searching the media content trigrams 516 of keywords identified from the audio 504 of the advertisement 502 promoting the media content item. By searching through the different trigrams 516a-1, especially the character level trigrams 516e-1, the media search system 500 may be able to match the correct media content item even if it includes incorrectly spelled homophones because the overall match between the trigrams 516 with the user utterance trigrams may be high even with the incorrect spelling of certain keywords.

The media search system may also be able to minimize the effects of incorrectly spelled homophones in speech recognized text translations of the user voice commands. By generating user utterance trigrams from the voice command inputs of a user as described in FIG. 4, the media search system may be able to overcome making any incorrect matches between the user search input describing the media content item and the media content item itself. By conducting such a media content search using user utterance trigrams and media content keyword trigrams, the media search system may be able to reduce the weight of any one utterance and/or keyword, thereby minimizing the chance that any one misspelled utterance or keyword may result in an incorrect match.

According to the example shown in FIG. 5, if the user searches for a media content by issuing the voice command "Ali G show where Buzz is interviewed" or "Rezurection episode in which Ali asks an astronaut if man can walk on the sun," the media search system 500 may generate word level and/or character level user utterance trigrams from such search inputs. The media search system 500 may also have identified keywords from advertisements promoting the particular episode of the "Ali G Rezurection" series that the user is searching for. Media content keyword trigrams such as the trigrams 516 may have been associated with the metadata for such a media content item. Accordingly, the metadata for each of the media content items that the media search system 500 may have access to may have been clustered with such media content keywords and trigrams. When the user issues voice commands, the media search system 500 may compare the resulting user utterances and/or user utterance trigrams against the media content keywords 514 and/or the media content trigrams 516 to determine a match between the user-issued voice commands and media content items. Since the metadata for the "Ali G Rezurection" episode may include keywords "Rezurection" (keyword 514c), "Buzz Lightyear" (keyword 514d), "Man Will Ever Walk on the Sun" (keyword 514e), the media search system 500 may determine that such a media content item 512 is a match. Additionally or alternatively, since the media content item 512 may be associated with content keyword trigrams such as "Ali Rezurection Buzz" (the word level trigram 516d), "Man Walk Sun" (the word level trigram 516c), "Ali" (the character level trigram 516i), and "i_G" (the character level trigram 516j), the media search system 500 may determine that the media content item 512 is the best match for the user issued voice commands. Accordingly, the media search system 500 may provide the user with the media content 512, or an indication of the media content 512, as the search result if the user issues such voice commands.

Although the description of FIG. 5 and much of the disclosure describes the media search system 500 being used to improve the search for media content items, such as television shows and movies, the media search system 500 may also be used for searching other items, such as consumer products, electronics, automobiles, etc. The media search system 500 may search through advertisements, social media networks (e.g., Facebook, Instagram, Twitter) to find content promoting a particular product (e.g., electronics, automobiles, etc.) that is included in a searchable database. The media search system 500 may extract keywords describing the product from the advertisements, social media posts, and other promotional content and include the extracted keywords describing the product as metadata describing the product in a searchable database. The media search system 500 may also generate trigrams from the extracted keywords as described above and index them in a searchable database. When a user conducts a product search, the media search system 500 may search through the database of extracted keywords and trigrams to find an accurate match for the product that the user is searching for, as described throughout this disclosure. In this manner, the media search system 500 may extract keywords describing the product that are different from the formal product description but may instead reflect how the general public colloquially refers to the product. By adding keywords of this nature to a searchable database's metadata, the media search system 500 may improve searching for various types of consumer products.

Figure 6A:
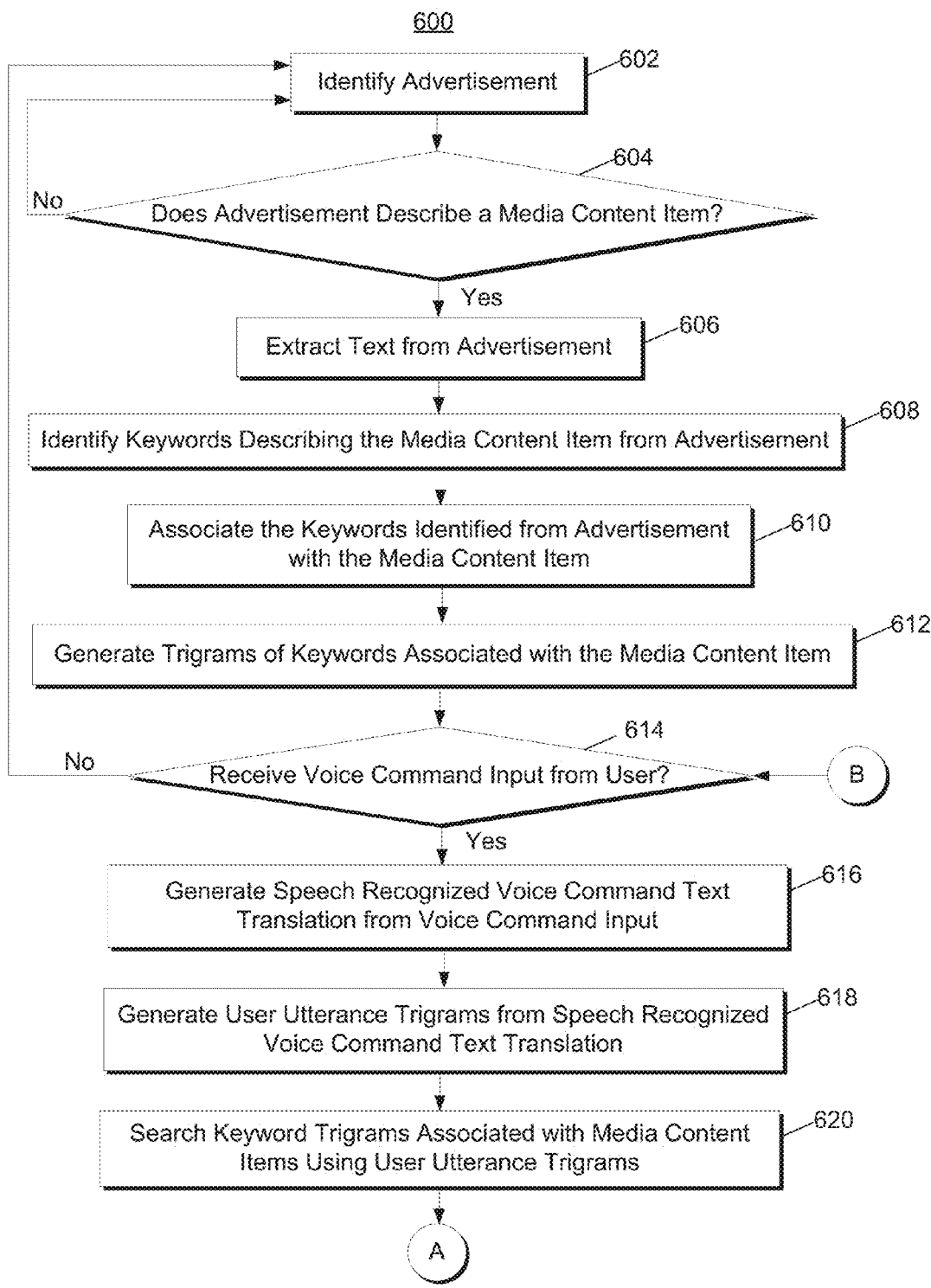
FIGS. 6A and 6B show an example algorithm illustrating features described herein.
Figure 6B:
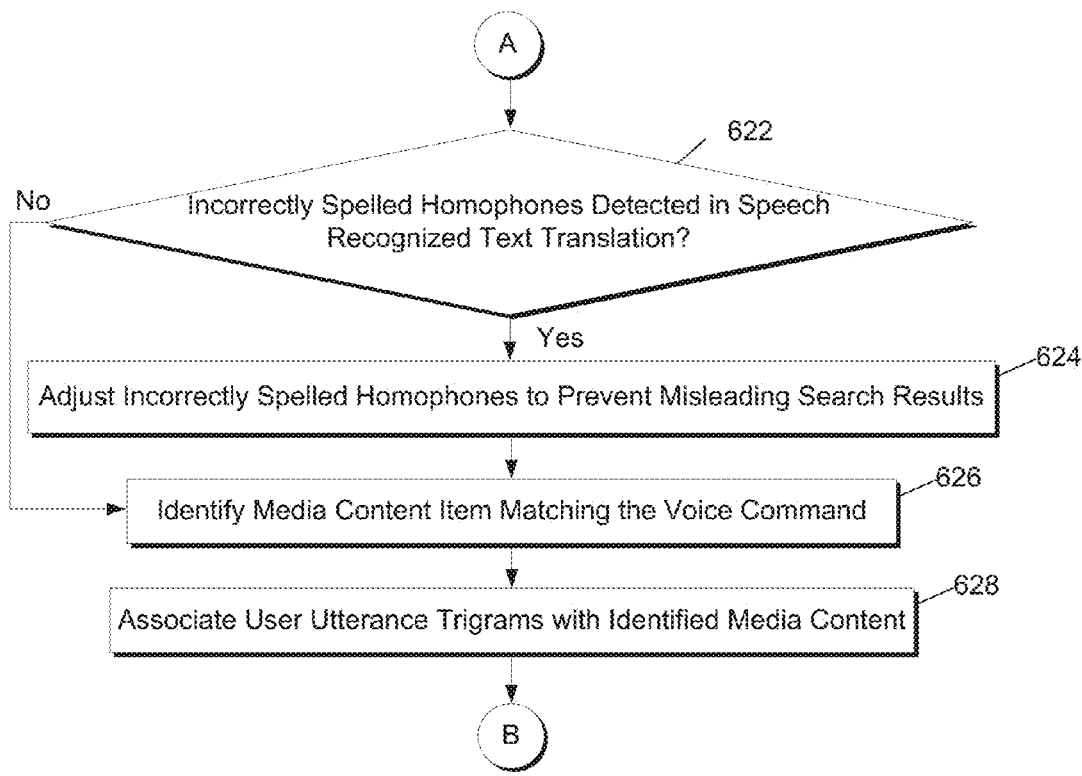

FIGS. 6A and 6B show an example method 600 according to the features as described herein. The method may be performed by, for example, the various components in the systems shown in FIGS. 1, 2, and 3 or any other computing device. The method may be implemented in a network environment having devices such as an application server 107, a user's consumption or access device (e.g., the display device 112, the gateway interface device 111, the personal computer 114, the wireless device 116, etc.), or any other desired computing device.

In step 602, an advertisement may be identified. An advertisement may either be identified from an advertisement database or it may be identified from a linear stream of media content broadcast from a media content server to a user device. For example, a computing device such as the computing device 302 of FIG. 3 may detect that a portion of a linear media stream received from a media content server may include one or more advertisements. Advertisements may be detected by analyzing the metadata and closed caption information associated with the media content for identifiers indicating the presence of an advertisement. Advertisements may be detected by analyzing volume levels and duration of media clips in the linear media stream. Once the advertisement has been identified, start and end times of each advertisement in the media content linear stream may be identified and noted in a memory of the computing device. Additionally or alternatively, advertisements may be identified by communicating with an advertisement database.

In step 604, the advertisement may be analyzed to determine whether it describes a media content item. Each advertisement from an advertisement database may be analyzed to determine whether it is related to a media content item. For example, the metadata and content of the advertisement may be analyzed to determine if the advertisement is promoting and/or describing a media content item. The advertisement may be a promotional trailer for a media content item scheduled to be broadcast at a future time. Additionally or alternatively, the advertisement may promote one or more media series. The advertisement may be analyzed to determine if it is has content that is related to such media content items such that the advertisement can be analyzed to identify keywords describing media content items. Each advertisement may be examined for mention of media content information that has been retrieved from a media guide database, to determine whether each advertisement is describing a media content item or not. The content analyzer 316 may associate each advertisement promoting a media content item with that media content. Advertisements or media content that do not promote and/or describe any media content items may be marked as such in a memory unit in order to not reference such an advertisement for media content extraction at any point in the future. If at step 604, the advertisement is determined to not describe any media content items, then the method 600 may proceed to identify a different advertisement for analysis at step 602. Each advertisement that has been identified from the linear stream of media content received from the media content server may be analyzed to determine whether it describes any media content items. The identified advertisements may be further processed according to steps 606-612 of the method 600.

In step 606, in response to determining that the advertisement describes a media content item, text may be extracted from the advertisement. Speech recognition may be performed on an audio signal of the advertisement to generate a text transcript of the advertisement's audio. Optical character recognition may be performed on a video signal of the advertisement to extract any text from the video of the advertisement. Closed caption information and metadata from the advertisement may be extracted to supplement the text transcript. Text extracted from each of such components of an advertisement may be used to generate a complete text transcript of the advertisement. Such a comprehensive text transcript may be used to ensure that every aspect of the advertisement may be analyzed during keyword analysis.

In step 608, keywords describing the media content item may be identified from the advertisement. Keywords describing the media content item may be identified from the text transcript generated from the advertisement in step 606. Articles of speech, pronouns, conjunctions, and/or commonly used words in the text transcript may be ignored in extracting keywords from the text transcripts of each advertisement. A keyword extraction engine may be programmed with specific rules that govern how to extract keywords. The keyword extraction engine may communicate with information servers to identify media content information (e.g., names of television channels and names of movies, television shows, and music, actor names, etc.) in order to determine which words from the text transcript of advertisements to extract. Keywords extracted from each advertisement may be stored in a memory unit, either locally on the computing device or remotely in an information server. Additionally or alternatively, media feeds from media content providers may be analyzed to extract additional keywords about the media content item described by the advertisement being analyzed. Once the media content item that is being promoted has been identified, additional sources of information such as online webpages and media feeds for that article may be searched and keywords describing the identified media content item may be identified.

In step 610, the keywords identified from the advertisement may be associated with the media content item. Once the keywords describing a media content item have been identified from the advertisement and/or from other sources such as media feeds and online databases, the keywords may be associated and/or clustered with the media content item that they are describing. For example, the keywords that have been identified to describe each media content item may be stored as metadata associated with that media content item. Such metadata may be stored in a database for later use in a media content search. Such a database may include keywords describing several different media content items grouped according to the media content item that they each describe.

In step 612, trigrams may be generated from the keywords associated with the media content item. For example, each of the keywords that have been associated with a particular media content item may be used to generate keyword trigrams. Word level and character level trigrams may be generated from the collection of keywords associated with each media content item. For example, a cluster of keywords may be identified by retrieving all associated keywords with a particular media content item. By examining the keyword cluster, multiple different characters from different keywords may be combined together to generate trigrams. Keywords may include phrases describing a media content item. Any three adjacently located characters in such a keyword phrase may be extracted to generate a character level keyword trigram. Different keywords and/or keyword phrases may be combined to generate unique keyword phrases, from which three adjacently located characters may be extracted. Similarly, word level keyword trigrams may be generated by combining such keywords and/or keyword phrases to extract three different words. Certain strategies may be used in combining keywords and/or keyword phrases to generate character level and/or word level keyword trigrams. For example, keywords and/or keyword phrases that are contextually related to one another may be combined together for use in generating trigrams. The generated keyword trigrams may be associated with their corresponding media content items. Such an association may be stored in the media content item's metadata.

In step 614, it may be determined whether a voice command input has been received from the user. Until such a user voice command input is received, steps 602-612 may be performed to associated different keywords and keyword trigrams with various media content items to enrich these media content items' metadata for a voice command search. Keywords and trigrams may be generated and associated with different media content items continuously as new advertisements and new sources of media content information become available. A search for media content items may begin when a voice command input is detected. The computing device may continuously monitor for any voice command inputs received from the user. Such voice command inputs may be received from a microphone or another audio user interface device configured to deliver user speech input to the computing device.

In step 616, in response to detecting a voice command input, a speech recognized (SR) voice command text translation may be generated from the voice command input. Once the voice command input is detected, the audio input may be converted to a text transcript using speech recognition techniques. The text translation may be generated and saved in a memory unit of the computing device for further processing.

In step 618, user utterance trigrams may be generated from the SR voice command input text translation. Once detected user voice commands are translated to a text transcript using SR techniques, the text transcript may be divided into smaller portions to separate different user commands, resulting in user utterances. Such user utterances may indicate a complete command or a portion of a user command. User utterance trigrams may be generated from one user utterance or a combination of multiple user utterances. Word level and character level user utterance trigrams may be generated by examining such user utterances. Any three adjacently located characters in a user utterance may be extracted to generate a character level keyword trigram. Different user utterances from the voice command text transcript may be combined to generate unique user utterance phrases, from which three adjacently located characters may be extracted to generate a user utterance character level trigram. Similarly, word level keyword trigrams may be generated by combining such user utterances and/or user utterance phrases to extract three different words. Certain strategies may be used in combining user utterances to generate character level and/or word level keyword trigrams. For example, user utterances that are contextually related to one another may be combined together for use in generating trigrams.

In step 620, keyword trigrams associated with media content items may be searched using the user utterance trigrams. Once it is determined that the user has issued a voice command to search for a particular media asset, keyword trigrams of different media content items may be searched to determine the degree of match with the user utterances trigrams that are generated from the user utterances related to media content search voice command. For example, a metadata database that includes keyword trigrams associated with various different media content items may be searched for trigram matches. Multiple different user utterance trigrams may be searched at the same time. The degree of match may increase based on the number of keyword trigrams associated with a media content item that match user utterance trigrams. In such a media search, both word level and character level trigrams may be searched. Character level keyword trigrams may be searched against character level user utterance trigrams and word level keyword trigrams may be searched against word level user utterance trigrams in any media search. Certain trigrams may have a higher weight attached to them, for example, based on their uniqueness, and a match between such trigrams may increase a match score than a trigram match between trigrams having a lower weighting. For example, a trigram generator may assign weights to trigrams based on the frequency of occurrence of such a trigram. If the trigram is not common to other user utterances and/or media content keywords, then such a trigram may have a relatively high score assigned than more commonly generated trigrams. Accordingly, a match between trigrams having a high weight may result in a match having a high weighting. Multiple different trigram matches may be required between user utterance trigrams and keyword trigrams. The match scores of each of the trigram matches between user utterances for a voice command search and the trigrams associated with a given media content item may be computed, summed, and normalized to determine an effective match score between a media content item and the voice command search.

In step 622, incorrectly spelled homophones may be detected in user utterances and/or keywords from an SR text translation of the voice command input and/or advertisement audio, respectively. As voice commands and audio signals of advertisements are translated to text using SR techniques, certain words may be spelled with the spelling of their homophones. For example, the word "Rezurection" from the comedy show "Ali G Rezurection" may be spelled using the spelling of its homophone "Resurrection." Once such a word has been spelled using the spelling of its homophone, the system may detect that one or more keywords from the audio transcript of the advertisement or a user utterance may be incorrectly spelled. In some embodiments, such a spelling error may be detected during the voice command media search. In other embodiments, such an error may be detected during text translation of an audio signal. Spelling errors in text translations may be detected by comparing the keyword or user utterance to media information or other sources of information. For example, by parsing through webpages or media feeds for such a show, it may be determined that "Rezurection" is the correct spelling and that the SR spelling of "Resurrection" is incorrect. For example, "Resurrection" may be determined to be incorrect if it is determined that the spelling "Resurrection" is not associated with that media content item in such webpages and/or media feeds. If no spelling error is detected, the method 600 may proceed to step 626 to identify the media content item in the voice command search.

In step 624, in response to detecting an incorrect spelling in media keywords or user utterances, the incorrectly spelled homophones may be adjusted to prevent misleading search results. In some embodiments, after such a spelling error is detected, the associated keywords or user utterances may be corrected with the appropriate spelling. Trigrams resulting from such keywords or user utterances may also be corrected with the appropriate spelling. Additionally or alternatively, the incorrectly spelled keyword or utterance and associated trigrams may be deleted.

In some embodiments, no such detection for incorrectly spelled homophones may be performed. However, in such embodiments, the incorrect spelling may not necessarily cause the search to render incorrect results (e.g., returning the wrong media content item and/or not returning any media content item as a search result). For example, as a virtue of performing a trigram search with multiple user utterances trigrams being searched against multiple keyword trigrams associated with each media content item, a few spelling errors may not significantly affect the match score between the media content item and the voice command input specifying the properties of the desired media content item.

In step 626, a media content item matching the voice command may be identified. Once any spelling errors, if detected in a text translation, are resolved, the media search may be completed and a resulting media content item that best matches the user voice command input may be identified. For example, the media content item with the highest match score between its associated keyword trigrams and the user utterance trigrams (or an indication thereof) may be provided to the user as a result of the trigram match process.

In step 628, the user utterance trigrams in the voice command input may be associated with the media content item identified to match the voice command. Once a media content item has been identified to best match the voice command input identifying the characteristics of the desired media content item, the user utterances and/or the user utterance trigrams corresponding to such a voice command input may be associated with the resulting media content item. Such user utterances and/or user utterance trigrams may be added to the metadata of the media content to enhance the pre-existing database of keywords and/or keyword trigrams to provide more an improved media search in the future.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. For example, in some embodiments, steps 602-612, steps 614-620, and/or steps 622-624 may be performed simultaneously.

It will also be appreciated and understood that modifications may be made without departing from the true spirit and scope of the present disclosure. The description is thus to be regarded as illustrative instead of restrictive on the present disclosure.

It is noted that various connections are set forth between elements in the above description. These connections are described in general and, unless specified otherwise, may be direct or indirect; this specification is not intended to be limiting in this respect.

What is claimed is:

1. A method comprising:
    based on a determination that a first media content item describes a second media content item, determining, by a computing device via an analysis of the first media content item, a plurality of keywords corresponding to the first media content item;
    associating one or more keywords of the plurality of keywords with the second media content item;
    receiving a search request indicative of a keyword of the one or more keywords;
    performing a search for media content items associated with the keyword of the one or more keywords; and
    outputting, for display, an indication corresponding to the second media content item as a result of the search.

2. The method of claim 1, wherein the first media content item is an advertisement comprising content describing the second media content item.

3. The method of claim 1, wherein the determining the plurality of keywords comprises at least one of:
    determining the plurality of keywords from an audio signal of the first media content item by performing speech recognition on the audio signal,
    determining the plurality of keywords by parsing closed caption information associated with the first media content item,
    determining the plurality of keywords by parsing metadata of the first media content item, or
    determining the plurality of keywords from a video signal of the first media content item by performing optical character recognition on video frames of the video signal.

4. The method of claim 1, wherein the associating the one or more keywords with the second media content item comprises:
    clustering at least two keywords of the plurality of keywords to form an n-gram; and
    associating the n-gram with metadata of the second media content item, wherein the metadata is configured for use during the search to locate the second media content item.

5. The method of claim 1, wherein the associating the one or more keywords with the second media content item comprises:
    adding the one or more keywords to metadata associated with the second media content item, wherein the metadata is configured for use during the search to locate the second media content item.

6. The method of claim 1, further comprising:
    monitoring user input for a word describing the second media content item; and
    adding the word to metadata associated with the second media content item.

7. The method of claim 1, wherein the receiving the search request comprises:
    receiving a speech input comprising one or more user utterances; and
    generating a cluster of user utterances from the one or more user utterances, wherein the performing the search comprises comparing the cluster of user utterances with the one or more keywords.

8. The method of claim 7, wherein the associating the one or more keywords with the second media content item comprises:
    clustering the one or more keywords into one or more trigrams; and
    associating the one or more trigrams with the second media content item, wherein the comparing the cluster of user utterances with the one or more keywords comprises comparing the cluster of user utterances with the one or more trigrams.

9. The method of claim 1, further comprising:
    clustering the one or more keywords into one or more keyword trigrams, wherein the receiving the search request comprises:
    receiving a speech input comprising one or more user utterances; and
    generating one or more user utterance trigrams from the one or more user utterances, and wherein the performing the search comprises:
    comparing the one or more user utterance trigrams with the one or more keyword trigrams.

10. The method of claim 7, the method further comprising:
    determining that the cluster of user utterances comprises an incorrectly spelled utterance that is homophonous to a keyword describing the second media content item; and
    before performing the search, correcting a spelling of the incorrectly spelled utterance.

11. A method comprising:
    determining, by a computing device, an advertisement comprising media content describing a scheduled media item;
    determining, based on the media content, one or more keywords describing the scheduled media item;
    associating the one or more keywords with the scheduled media item;

receiving a search input comprising one or more user utterances;

determining that the scheduled media item is a search result by comparing the one or more user utterances with the one or more keywords; and outputting, for display, an indication corresponding to the scheduled media item.

12. The method of claim 11, wherein the determining the one or more keywords describing the scheduled media item comprises:

determining, based on the media content, at least one online database entry related to the scheduled media item; and determining the one or more keywords from the at least one online database entry.

13. The method of claim 11, wherein the associating the one or more keywords with the scheduled media item comprises:

adding the one or more keywords to metadata associated with the scheduled media item, wherein the metadata is configured for use during a search to locate the scheduled media item.

14. The method of claim 11, further comprising:

generating a cluster of user utterances from the one or more user utterances, wherein the determining that the scheduled media item is the search result is based on a determination that the one or more keywords corresponds to the cluster of user utterances.

15. The method of claim 11, wherein the associating the one or more keywords with the scheduled media item comprises:

clustering the one or more keywords into one or more trigrams; and associating each trigram of the one or more trigrams with the scheduled media item, wherein the determining that the scheduled media item is the search result comprises determining that at least one trigram of the one or more trigrams matches at least one user utterance of the one or more user utterances.

16. The method of claim 15, wherein the determining that the at least one trigram matches the at least one user utterance comprises:

generating one or more user utterance trigrams from terms in the at least one user utterance; and comparing the one or more user utterance trigrams with the at least one trigram of the one or more trigrams.

17. A method comprising:

determining, by a computing device via an analysis of a first media content item, a plurality of keywords describing a second media content item;

clustering the plurality of keywords into a plurality of trigrams;

associating the plurality of trigrams with the second media content item;

receiving a search input comprising one or more user utterances;

determining that the second media content item is a search result, based on a determination that the one or more user utterances corresponds to at least one trigram of the plurality of trigrams; and outputting, for display, an indication corresponding to the second media content item.

18. The method of claim 17, further comprising:

generating one or more user utterance trigrams from terms in the one or more user utterances, wherein the determining that the second media content item is the search result comprises comparing the one or more user utterance trigrams with the at least one trigram of the plurality of trigrams.

19. The method of claim 17, wherein the determining the plurality of keywords describing the second media content item comprises:

determining, based on the analysis of the first media content item, at least one online database entry related to the second media content item; and determining at least one keyword of the plurality of keywords based on the at least one online database entry.

20. The method of claim 17, wherein the first media content item is an advertisement comprising media content that describes the second media content item.

* * * * *

UNITED STATES PATENT AND TRADEMARK OFFICE
CERTIFICATE OF CORRECTION

PATENT NO. : 10,445,360 B2
APPLICATION NO. : 14/950244
DATED : October 15, 2019
INVENTOR(S) : George Thomas Des Jardins It is certified that error appears in the above-identified patent and that said Letters Patent is hereby corrected as shown below:

In the Specification

Detailed Description, Column 5, Line 27:
Please delete "HTMLS," and insert --HTML5,--

Detailed Description, Column 10, Line 43:
Delete "304" and insert --314--

Detailed Description, Column 13, Line 17:
Delete "328" and insert --324--

Detailed Description, Column 18, Line 57:
Delete "426" and insert --406--

Detailed Description, Column 21, Line 61:
Delete "520." and insert --502.--

Detailed Description, Column 22, Line 13:
Delete "516e-1" and insert --516e-l--

Detailed Description, Column 22, Line 25:
Delete "516i-1" and insert --516i-l--

Detailed Description, Column 23, Line 11:
Delete "516a-1," and insert --516a-l,--

Detailed Description, Column 23, Line 12:
Delete "516e-1," and insert --516e-l,--

Signed and Sealed this
Sixteenth Day of August, 2022

Katherine Kelly Vidal
*Director of the United States Patent and Trademark Office*

CERTIFICATE OF CORRECTION (continued)
U.S. Pat. No. 10,445,360 B2

In the Claims

Column 32, Line 26:
In Claim 18, after "result", insert --further--